US012781014B2

(12) United States Patent
Nair

(10) Patent No.: US 12,781,014 B2
(45) Date of Patent: Nov. 3, 2026

(54) FOAMED AND FOAMABLE COMPOSITIONS CONTAINING SOLID POLYMERIC PARTICLES

(71) Applicant: Eastman Kodak Company, Rochester, NY (US)

(72) Inventor: Mridula Nair, Penfield, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 545 days.

(21) Appl. No.: 18/476,771

(22) Filed: Sep. 28, 2023

(65) Prior Publication Data

US 2024/0018326 A1 Jan. 18, 2024

Related U.S. Application Data

(63) Continuation-in-part of application No. 16/999,111, filed on Aug. 21, 2020, now Pat. No. 11,932,744.

(51) Int. Cl.
*C08J 9/236* (2006.01)
*C08J 9/00* (2006.01)
*C08J 9/30* (2006.01)

(52) U.S. Cl.
CPC ............. *C08J 9/236* (2013.01); *C08J 9/0061* (2013.01); *C08J 9/0066* (2013.01); *C08J 9/30* (2013.01); *C08J 2301/02* (2013.01); *C08J 2467/00* (2013.01)

(58) Field of Classification Search
CPC ........ C08J 9/236; C08J 9/0061; C08J 9/0066; C08J 9/30; C08J 2301/02; C08J 2467/00; C08J 2201/026; C08J 2401/10; D06N 3/0043; D06N 3/0047; D06N 3/0059; D06N 3/0063; D06N 3/0065; D06N 3/0068; D06N 3/045; D06N 3/005; D06N 3/0077; D06N 3/04; D06N 3/042; D06N 3/06; C09D 5/32
See application file for complete search history.

(56) References Cited

U.S. PATENT DOCUMENTS 4,677,016 A 6/1987 Ferziger et al.
4,833,060 A 5/1989 Nair et al.
4,965,131 A 10/1990 Nair et al.
7,056,637 B2 6/2006 Fields et al.
9,469,738 B1 10/2016 Nair et al.
9,891,350 B2 2/2018 Lofftus et al.
9,963,569 B2 5/2018 Nair et al.
10,233,590 B2 3/2019 Brick et al.
11,370,924 B2 * 6/2022 Nair .......................... C09D 7/61
2016/0355660 A1 * 12/2016 Brick ................... D06N 3/0065
2018/0094112 A1 * 4/2018 Nair .......................... C09D 5/32
2018/0223474 A1 8/2018 Nair et al.
2019/0390027 A1 12/2019 Nair et al.

FOREIGN PATENT DOCUMENTS

EP 2354846 9/2011
EP 2364846 9/2011

OTHER PUBLICATIONS

Disclosed anonymously via The IP.com Journal (on-line public disclosure site). https://priorart.ip.com/IPCOM/000259627 "Light-Blocking Articles From Foamed Composition Containing Solid Polymeric Particles," pp. 1-24, published on Aug. 28, 2019 (IPCOM000259627D).

* cited by examiner

*Primary Examiner* — K. Boyle
(74) *Attorney, Agent, or Firm* — J. Lanny Tucker

(57) ABSTRACT

Foamable and foamed aqueous compositions can be used to provide foamed, opacifying elements for use as light-blocking window shades, curtains, or other materials. These light-blocking articles can also have a printable outer surface that accepts ink for making printed images that are not observable from the opposite surface. Such foamable and foamed aqueous compositions comprise nonporous polymeric particles.

8 Claims, No Drawings

FOAMED AND FOAMABLE COMPOSITIONS CONTAINING SOLID POLYMERIC PARTICLES

CROSS-REFERENCE TO RELATED APPLICATION

This application is a Continuation-in-Part of application U.S. Ser. No. 16/999,111, filed Aug. 21, 2020, entitled "Light-blocking Articles From Foamed Composition Containing Solid Polymeric Particles" by Mridula Nair.

FIELD OF THE INVENTION

This invention relates to foamable and foamed aqueous compositions that can be used to form foamed opacifying layers in opacifying or light-blocking elements.

BACKGROUND OF THE INVENTION

In general, when light strikes a surface, some of it may be reflected, some absorbed, some scattered, and the rest transmitted. Reflection can be diffuse, such as light reflecting off a rough surface such as a white wall, in all directions, or specular, as in light reflecting off a mirror at a definite angle. An opaque substance transmits almost no light, and therefore reflects, scatters, or absorbs all of it. "Blackout" or light blocking materials typically refer to articles having coated layers that are substantially impermeable to light. Thus, when a blackout material such as a blackout curtain or shade is hung over a window, it generally blocks substantially all external light from entering the room through that window. Blackout materials are suitable as curtains and shades for domestic use, for institutional use in hospitals and nursing homes, as well as for use in commercial establishments such as hotels, movie theaters, and in aircraft windows.

Light blocking articles such as the blackout curtains or shades can be comprised of a fabric substrate coated with more than one layer of a foamed latex composition. There is a desire for these curtains, in addition to blocking transmitted light, to have a light color (hue) facing the environment where an activity needs illumination. An example is when the function of the blackout material is to separate two areas of activity where one or both areas can be artificially lit at the same time. More often than not, the function of a blackout curtain is to prevent sunlight from entering a room through a building window.

Porous fabrics are derived from yarns of manmade or naturally-occurring threads that are woven or knitted together. Threads used to make yarn are often twisted together to form the threads. Synthetic plastic coating materials, such as polyvinyl chloride, led to the emergence of fabrics woven from plastic coated yarns. Such fabrics have increased durability and wear properties compared to fabrics made from naturally occurring fibers. One use for such fabrics is window shades especially for commercial and hospital sites.

Light colored blackout curtains theoretically can be made by coating porous fabrics with light colored foams containing light scattering pigments such as titanium dioxide or clays. However, very thick foam coatings will be needed to create blackout curtains. A method that is practiced for reducing the weight of such blackout materials is to sandwich a light-absorbing, foamed black or grey pigment, such as a carbon black layer between two foamed light scattering, white pigment-containing layers.

When an electromagnetic radiation blocking coating has, as it often does, a strongly light absorbing material containing black pigments such as carbon black, between two reflective layers, it has at least two distinct problems. First, such coatings require three or more separate coating operations that reduce manufacturing productivity and increase unit costs. Secondly, carbon black in the light absorbing middle layer can become "fugitive" (or non-enclosed) from some puncture or tear occurring during sewing or laundering, and soil other layers such as the reflective layers, which is highly objectionable. Additionally, the stitches generated in the materials during sewing can cause the fugitive carbon from the light absorbing layer to spread over a larger area thereby increasing the area of objectionable shading of the light-colored surface.

U.S. Pat. No. 9,891,350 (Lofftus et al.) describes articles that are designed with an opacifying layer that is capable of blocking electromagnetic radiation. The opacifying layer is disposed on a substrate that can be composed of any suitable material and an underlying layer can be incorporated between the substrate and the opacifying layer.

Improved light-blocking articles are prepared from foamed aqueous compositions that are described in U.S. Pat. No. 9,469,738 (Nair et al.) in which very small amounts of opacifying colorants located in porous polymeric particles can be incorporated into a latex foam or foamed opacifying layer.

Such articles are also described in U.S. Pat. No. 9,963,569 (Nair et al) describes a method for providing a foamed, opacifying element includes providing a foamable aqueous latex composition comprising porous particles incorporated within them very small amounts of opacifying colorants, aerating it to a specific foam density, applying the foamed aqueous latex composition to a porous substrate, drying, and densifying the dried layer as a foamed opacifying layer.

With all of the improvements noted in the cited art, there is a further need to simplify the manufacturing process for making foamed opacifying layers by, for example, removing the more expensive porous particles and the involved method required for making them.

SUMMARY OF THE INVENTION

This invention provides a foamable aqueous composition for preparing a foamed opacifying composition, having at least 35% solids and up to and including 70% solids, and comprising:

(a) at least 0.05 weight % and up to and including 20 weight % of nonporous polymeric particles, each nonporous polymeric particle having a mode particle size of at least 2 μm and up to and including 50 μm;

(b) at least 15 weight % and up to and including 70 weight % of a (b) binder material having a glass transition temperature ($T_g$) of less than 40° C.;

(c) at least 0.0001 weight % and up to and including 30 weight % of two or more additives, at least one of these two or more additives being a foaming agent and another of these two or more additives being a foam stabilizing agent;

(d) water; and (e) at least 0.001 weight % and up to and including 2 weight %, of an opacifying colorant different from all of the (c) two or more additives, which opacifying colorant absorbs electromagnetic radiation having a wavelength of at least 380 nm and up to and including 800 nm, all amounts being based on the total weight of the foamable aqueous composition.

This invention further provides a foamed aqueous composition for preparing a foamed opacifying layer as described herein, having at least 35% solids and up to and including 70% solids, and comprising:

(a) at least 0.05 weight % and up to and including 20 weight % of nonporous polymeric particles, each nonporous polymeric particle having a mode particle size of at least 2 μm and up to and including 50 μm;

(b) at least 15 weight % and up to and including 70 weight % of a (b) binder material having a glass transition temperature ($T_g$) of less than 40° C.;

(c) at least 0.0001 weight % and up to and including 30 weight % of two or more additives, at least one of these two or more additives being a foaming agent and another of these two or more additives being a foam stabilizing agent;

(d) water; and (e) at least 0.001 weight % and up to and including 2 weight %, of an opacifying colorant different from all of the one or more additives of (c), which opacifying colorant absorbs electromagnetic radiation having a wavelength of at least 380 nm and up to and including 800 nm, all amounts being based on the total weight of the foamed aqueous composition, and the foamed aqueous composition having a foam density of at least 0.1 $g/cm^3$ and up to and including 0.5 $g/cm^3$.

Foamable and foamed aqueous compositions can be used to provide foamed, opacifying elements such as window shades, curtains, and other light-blocking materials that contain low amounts of opacifying colorants. The foamed, opacifying elements can also comprise a nonfoamed functional composition disposed over (in some embodiments, directly on) the light-blocking, foamed opacifying layer.

The embodiments of the present invention provide a number of advantages. For example, the present invention can be used to provide a foamed, opacifying element that exhibits desirable opacification with minimal opacifying colorant, minimizes exposure of the opacifying colorant to the environment, eliminates sewing and surface failures in the foamed, opacifying element, can be readily laundered, and provides flexibility, drapeability, and brighter and lighter coloration to an observer. In addition, the foamed, opacifying element can be provided in a simplified manufacturing process using fewer and less complex operations for making the particles and thus the foamed, opacifying element can be made more economically compared to the prior art materials containing porous polymeric particles in a foamed opacifying layer, such as those described in U.S. Pat. No. 9,469,738 (noted above).

Moreover, since the polymeric particles used in the present invention are not porous, maintaining the porosity and pores in the porous particles during high temperature drying and long residence times in the dryers, after applying the foamed aqueous composition on porous substrates is not a requirement, and hence any polymeric binder can be used to make the porous particles, and its glass transition temperature is not as critical. In applications where improved light scattering and opacity of the dry opacifying layer are not expected from the polymeric particles, nonporous polymeric particles are easier to make and use in the foamed opacifying layer compared to porous particles described in the prior art.

DETAILED DESCRIPTION OF THE INVENTION

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described for any specific embodiment.

Definitions

As used herein to define various components of the foamed aqueous composition, foamable aqueous composition, functional composition formulations, or materials used to prepare the nonporous particles, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered as approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the terms "foamed, opacifying element," "light-blocking element," and "element" are intended to be synonymous terms referring to the same article.

Unless otherwise indicated, the terms "foamed aqueous composition" and "foamed composition" are intended to be synonymous terms and to refer to the same material, and are different from a "functional composition" and "functional composition formulation" as described below.

The terms (a) "nonporous polymeric particle" and (a) "nonporous polymeric particles" are used herein, unless otherwise indicated, to refer to nonporous organic polymeric particles useful in the foamable aqueous compositions, foamed aqueous compositions, and foamed, opacifying elements according to the present invention. The (a) nonporous polymeric particles generally comprise a solid continuous polymeric phase comprised of one or more different polymers. The continuous polymeric phase also can be chemically crosslinked or elastomeric in nature, or both chemically crosslinked and elastomeric in nature.

The continuous polymeric phase of the (a) nonporous polymeric particles can have the same or different composition throughout that solid phase. If mixtures of organic polymers are used in the continuous polymeric phase, generally those mixtures can be dispersed uniformly throughout.

The (a) nonporous polymeric particles used in this invention generally have a porosity of less than 5 volume % or even less than 1 volume %, all based on the total porous particle volume to distinguish from "porous" polymeric particles in the art. Porosity can be measured by a modification of the known mercury intrusion procedure.

Glass transition temperatures of the organic polymers used to prepare the continuous polymeric phase, can be measured using Differential Scanning Calorimetry (DSC)

using known procedures. For many commercially available organic materials, the glass transition temperatures are known from the suppliers.

Unless otherwise indicated herein, the terms "first opposing surface" and "second opposing surface" refer to the opposing surfaces of the substrate (described below) used to form a foamed, opacifying element according to the present invention. The terms "first outer surface" and "second outer surface" refer to the opposing outer surfaces of a foamed, opacifying element formed according to the present invention.

Uses

The foamable aqueous compositions, foamed aqueous compositions, and any other composition formulations described herein can be used to prepare foamed, opacifying elements that in turn can be useful as radiation ("light") blocking materials or blackout materials for various environments and structures. The foamed, opacifying elements can also exhibit improved sound and heat blocking properties. The foamed, opacifying elements exhibit blackout or light-blocking properties and can optionally have a printable outer surface capable of being embossed or accepting ink used in screen printing, gravure printing, inkjet printing, thermal imaging (such as "dye sublimation thermal transfer"), or other imaging processes. Thus, one can provide embossable or printable surfaces in such foamed, opacifying elements so that the printed image on one outer surface is generally not observable from the other outer surface.

Foamable Aqueous Compositions

The foamable aqueous compositions described herein can be suitably aerated to provide foamed aqueous compositions, for example to prepare a foamed, opacifying element. Each foamable aqueous compositions has five essential components that are needed to obtain the properties of the foamed, opacifying element described herein: (a) nonporous polymeric particles as described below; (b) a binder material, also described below; (c) two or more additives as described below, for example comprising at least one surfactant; (d) water; and (e) an opacifying colorant different from all of the compounds of component (c). This opacifying colorant is chosen to absorb electromagnetic radiation generally in the UV and visible regions of the electromagnetic spectrum, for example, wavelengths of at least 250 nm and up to and including 800 nm.

The foamable aqueous composition generally has at least 35% and up to and including 70% solids, or more particularly at least 40% and up to and including 60% solids.

(a) Nonporous Polymeric Particles:

Nonporous polymeric particles are used in the opacifying layers and they are generally prepared using the limited coalescence process as described in U.S. Pat. No. 4,833,060 (Nair et al.) and 4,965,131 (Nair et al.). Thus, the (a) nonporous polymeric particles are generally polymeric and organic in nature (that is, the continuous polymeric phase is polymeric and organic in nature). Such particles can also be prepared using the commonly practiced melt pulverization method used for making electrophotographic toners, the details of which are known from numerous publications dating back several decades including but not limited to U.S. Pat. No. 7,056,637 (Fields et al.), the disclosure of which is incorporated herein by reference.

The (a) nonporous polymeric particles are derived from one or more organic polymers that are chosen so that the polymeric particles have a glass transition temperature ($T_g$) of greater than 25° C.

The (a) nonporous polymeric particles can be composed of one or more polymers selected from the following materials: polyesters, styrenic polymers (for example polystyrene and polychlorostyrene), mono-olefin polymers (for example, polymers formed from one or more of ethylene, propylene, butylene, and isoprene), vinyl ester polymers (for example, polymer formed from one or more of vinyl acetate, vinyl propionate, vinyl benzoate, and vinyl butyrate), polymers formed from one or more α-methylene aliphatic monocarboxylic acid esters (for example, polymers formed from one or more of methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate), vinyl ether polymers (such as polymers formed from one or more of vinyl methyl ether, vinyl ethyl ether, and vinyl butyl ether), and vinyl ketone polymers (for example, polymers formed from one or more of vinyl methyl ketone, vinyl hexyl ketone, and vinyl isopropenyl ketone). Other useful polymers include polyurethanes, urethane acrylic copolymers, epoxy resins, silicone resins, polyamide resins, and polyesters of aromatic or aliphatic polycarboxylic acids with one or more aliphatic diols, such as polyesters of isophthalic or terephthalic or fumaric acid with diols such as ethylene glycol, cyclohexane dimethanol, and bisphenol adducts of ethylene or propylene oxides. The polyesters can be saturated or unsaturated. Other useful polyesters include lactic acid polymers, glycolic acid polymers, caprolactone polymers, and hydroxybutyric acid polymers.

Also useful are one or more cellulose polymers (or cellulosic polymers) including but not limited to, those cellulosic polymers derived from one or more of cellulose acetate, cellulose butyrate, cellulose acetate butyrate, and cellulose acetate propionate. Mixtures of these cellulose polymers can also be used if desired, and mixtures comprising a polymer derived from cellulose acetate butyrate as at least 80 weight % of the total of cellulose polymers (or of all polymers in the continuous polymeric phase) are particularly useful mixtures. Details about such polymers are provided, for example, in U.S. Pat. No. 9,963,569 (Nair et al.), the disclosure of which is incorporated herein by reference.

The (a) nonporous polymeric particles can also be derived from ethylenically unsaturated polymerizable monomers and polyfunctional reactive compounds.

In general, the (a) nonporous polymeric particles have a mode particle size equal to or less than 50 μm, or of at least 2 μm and up to and including 50 μm, or typically of at least 3 μm and up to and including 30 μm or even up to and including 40 μm. Mode particle size represents the most frequently occurring diameter for spherical particles and the most frequently occurring largest diameter for the non-spherical particles in a particle size distribution histogram, which can be determined using known equipment (including light scattering equipment such as the Sysmex FPIA 3000 Flow Particle Image Analyzer that used image analysis measurements and that can be obtained from various sources including Malvern Panalytical; and coulter counters and other particle characterizing equipment available from Beckman Coulter Diagnostics), software, and procedures.

The (a) nonporous polymeric particles can be spherical or non-spherical depending upon the desired use and have the porosity described above of less than 5 volume % or even less than 1 volume %.

The (a) nonporous polymeric particles are generally present in the foamable aqueous composition in an amount of at least 0.05 weight % and up to and including 20 weight %, or typically at least 0.5 weight % and up to and including 15 weight %, based on the total weight of the foamable aqueous composition (including all solvents that are present).

Optimal foamed opacifying layers comprise: (a) nonporous polymeric particles containing a small amount of an (e) opacifying colorant as described below to enhance the light blocking capacity of the (a) nonporous polymeric particles (particularly transmitted light blocking capacity. The foamed aqueous composition used to prepare the foamed opacifying layer comprises foam cells that surround the (a) nonporous polymeric particles.

(b) Binder Materials:

The foamable and foamed aqueous compositions used in the present also comprises one or more (b) binder materials that can behave as a binding matrix for all the materials in such wet compositions and can form the (b') matrix material to hold the (a) nonporous polymeric particles, (c) two or more additives, and (e) opacifying colorants together in a foamed opacifying layer.

It is particularly useful that the (b) binder material have the following properties: it is water-soluble or water-dispersible; it is capable of forming a stable foamed aqueous composition with the essential and optional components described herein; it is capable of being disposed onto a suitable substrate as described below; it does not inhibit the aeration (foaming) process (described below); it is capable of being dried and where desired also crosslinked (or cured); it has good light and heat stability; and it is film-forming but upon curing, it contributes to the flexibility of the foamed, opacifying element and is thus not too brittle, for example having a $T_g$ of less than 40° C. as determined using Differential Scanning Calorimetry.

The choice of (b) binder material can also be used to increase the cleanability of the resulting foamed opacifying compositions in the foamed, opacifying elements. In addition, the (b) binder material can be used to provide a (b') matrix material that adds to a supple feel to touch and flexibility especially when disposed on a porous substrate (for example, a fabric) that is meant for window coverings such as draperies.

The (b) binder material can include one or more organic polymers that are film forming and that can be provided as an emulsion, dispersion, or an aqueous solution, and that cumulatively provide the properties noted above. It can also include polymers that are self-crosslinking or self-curable, or it can include one or more polymers to which crosslinking agents are added and are thus curable or capable of being crosslinked (or cured) under appropriate conditions.

Useful (b) binder materials include but are not limited, to poly(vinyl alcohol), poly(vinyl pyrrolidone), ethylene oxide polymers, polyurethanes, urethane-acrylic copolymers, other acrylic polymers, styrene polymers, styrene-acrylic copolymers, vinyl polymers, vinyl-acrylic polymers, styrene-butadiene copolymers, acrylonitrile copolymers, polyesters, silicone polymers, or a combination of two or more of these organic polymers. The binder material can be anionic, cationic or nonionic in net charge. A useful class of film-forming (b) binder materials includes aqueous latex polymer dispersions such as acrylic latexes (including acrylic copolymers) that can be ionic or nonionic colloidal dispersions of acrylate polymers and copolymers. For example, useful film-forming aqueous latexes include but are not limited to, styrene-butadiene latexes, poly(vinyl chloride) and poly(vinylidene chloride) latexes, poly(vinyl pyridine) latexes, poly(acrylonitrile) latexes, poly(vinyl chloride)-acrylic copolymers, and latexes formed from N-methylol acrylamide, butyl acrylate, and ethyl acrylate.

The one or more (b) binder materials can be present in the foamable aqueous composition in an amount of at least 15 weight %, or at least 20 weight % and up to and including 70 weight %, or typically at least 30 weight % and up to and including 50 weight %, based on the total foamable aqueous composition (that is, the total weight of all components including all solvents).

(c) Additives:

The foamable aqueous compositions can include at least 0.0001 and up to and including 30 weight % of (c) two or more additives, and typically such (c) two or more additives can comprise at least one foaming agent and at least one foam stabilizing agent, as defined below. These amounts refer to the total of all the (c) two or more additives in each foamable aqueous composition and are based on the total weight of those compositions. There can be mixtures of each type of the (c) two or more additives, or mixtures of two or more types of the (c) two or more additives in each of the foamable aqueous compositions.

Any of these (c) two or more additives or mixtures thereof, can be present within any location of the foamed aqueous composition, including but not limited to the (b) binder materials or the (a) nonporous polymeric particles, or both.

In all embodiments, the (c) two or more additives are not the same compounds or do not have the same function as the (a) nonporous polymeric particles, (b) binder materials, and (e) opacifying colorants as described herein.

Useful (c) two or more additives include but are not limited to plasticizers, inorganic or organic pigments and dyes (for example, pigment or dye colorants different from the opacifying colorants described below), flame retardants, biocides (such as fungicides and antimicrobial agents), preservatives, pH buffers, optical brighteners, tinting colorants, metal particles such as metal platelets or metal flakes, thickeners, and inert inorganic or organic fillers (such as clays) that are not any of the other materials or opacifying colorants described below.

The "inert" inorganic or organic fillers are particles that can be added to reduce the use of more expensive (b) binder materials. Such fillers do not undergo a chemical reaction in the presence of water or other components in the foamable aqueous composition; nor do they absorb significant electromagnetic radiation like the (e) opacifying colorants. Useful inert organic or inorganic filler materials include but are not limited to titanium dioxide, talc, clay (for example, kaolin), magnesium hydroxides, aluminum hydroxides, dolomite, glass beads, silica, mica, glass fibers, nano-fillers, and calcium carbonate.

One or more plasticizers can be added to soften the "hand" of the final foamed, opacifying element.

One of the (c) two or more additives is a foaming agent that functions to create and enhance foam formation. The (c) two or more additives comprise one or more foaming agents (surfactants) as well as one or more foam stabilizing agents that are also surface-active agents that function to structure and stabilize the foam. Examples of useful foaming agents (surfactants) and foam stabilizing dispersing agents include but are not limited to, ammonium stearate, sodium lauryl sulfate, ammonium lauryl sulfate, ammonium sulfosuccinate, disodium stearyl sulfosuccinate, diammonium n-octadecyl sulfosuccinamate, ethoxylated alcohols, ionic, nonionic or anionic agents such as fatty acid soaps or a fatty acid condensation product with an alkylene oxide, for example, the condensation product of ethylene oxide with lauryl or oleic acid or an ester of fatty alcohols and similar materials, many of which can be obtained from various commercial sources.

Other useful (c) two or more additives include metal particles that can be obtained from any available commercial source as metal flakes or metal platelets and in dry form or as a suspension. Such metal flakes or metal platelets are substantially 2-dimensional particles, having opposing surfaces or faces separated by a relatively minor thickness dimension. The metal flakes can have a size range of at least 2 μm and up to and including 50 μm in main surface equivalent circular diameter (ECD) wherein the ECD is the diameter of a circle having the same area as the main face. The metal particles can be in the foamable aqueous composition in any suitable location but they are particularly useful when incorporated within the (a) nonporous polymeric particles.

Useful biocides (that is, antimicrobial agents or antifungal agents) that can be present as (c) two or more additives include but are not limited to, silver metal (for example, silver particles, platelets, or fibrous strands) and silver-containing compounds such as silver chelates and silver salts such as silver sulfate, silver nitrate, silver chloride, silver bromide, silver iodide, silver iodate, silver bromate, silver tungstate, silver phosphate, and silver carboxylates. In addition, copper metal (for example, copper particles, platelets, or fibrous strands) and copper-containing compounds such as copper chelates and copper salts can be present as (c) two or more additives for biocidal purposes.

It can also be useful to include thickeners as (c) two or more additives to modify the viscosity of the foamable aqueous composition and to stabilize it if aeration is not inhibited. Useful thickeners can be utilized to control the rheology of the foamable aqueous composition depending upon the method used to form the dry opacifying layer on a substrate as described below.

Useful (c) two or more additives can comprise one or more tinting colorants that can be suitable dyes or pigments (or combinations) and can be used to provide a specific observable color, coloration, or hue in the resulting foamed, opacifying elements. These materials are not chosen to provide the opacifying property described below for the (e) opacifying colorants and thus, tinting colorants are intended to be different materials than the (e) opacifying colorants. Mixtures of tinting colorants can be present in the foamable aqueous compositions and they can be different in composition and amount from each other. The desired coloration or hue can be obtained using specific tinting colorants can be used in combination with (e) opacifying colorant(s) described below to offset or modify the original color of a foamed, opacifying element (without such materials) to provide more whiteness (or brightness or increased L*) in the final "color" (or coloration). The one or more tinting colorants can be incorporated within the (a) nonporous polymeric particles or they can be uniformly dispersed within the (b) binder material.

The one or more tinting colorants can be present in the foamable aqueous composition in an amount of at least 0.0001 weight %, or more typically at least 0.001 weight % and up to and including 3 weight %, based on the total weight of the foamable aqueous composition (including all solvents).

It can also be useful to include one or more optical brighteners as (c) two or more additives to increase the whiteness (brightness, L*, or "fluorescent" effect) of the final coloration in the foamed, opacifying element. Optical brighteners are sometimes known in the art as "fluorescent whiteners" or "fluorescent brighteners." In general, such materials are organic compounds selected from classes of known compounds such as derivatives of stilbene and 4,4'-diaminostilbene (such as bistriazinyl derivative); derivatives of benzene and biphenyl (such as styril derivatives); pyrazolines; derivatives of bis(benzoxazole-2-yl); coumarins; carbostyrils; naphthalimides; s-triazines; and pyridotriazoles.

(d) Aqueous Medium:

Water is the primary solvent used in an (d) aqueous medium in the foamable aqueous compositions. By "primary" is meant that of the total weight of solvents, water comprises at least 75 weight %, and more likely at least 80 weight % and up to and including 100 weight % of the total solvent weight. Auxiliary solvents that can be present must not adversely affect or harm the other components in the composition. Such auxiliary solvents can be water-miscible organic solvents such as alcohols and ketones.

The (d) aqueous medium then, which is primarily water, comprises at least 30 weight % and up to and including 65 weight % of the total weight of the foamable aqueous composition.

(e) Opacifying Colorants:

The (e) opacifying colorants can be a single material or chosen from any suitable combination of materials such that the single or multiple materials absorb UV and visible electromagnetic radiation (defined above) to provide blackout properties (or suitable opacity). (e) Opacifying colorants can be soluble dyes or pigments or combinations of each or both types of materials. The (e) opacifying colorants are different compositionally and functionally from the compounds defined above as the (c) two or more additives.

In most embodiments, the one or more (e) opacifying colorants are present within the (a) nonporous polymeric particles. However, in some embodiments, it can be useful to incorporate (e) opacifying colorants solely or additionally within the (b) binder material in which the (a) nonporous polymeric particles are dispersed.

While the (e) opacifying colorant(s) can provide some coloration or desired hue, they may not be chosen for that purpose and are thus materials that are chosen to be different from the tinting colorants described above.

Examples of (e) opacifying colorants that can be used individually or in combination include but are not limited to, neutral or black pigments or dyes, a carbon black, black iron oxide, graphite, aniline black, anthraquinone black, and combinations of colored pigments or dyes such as combinations of two or more cyan, magenta, green, orange, blue, red, and violet dyes. A carbon black, a neutral or black pigment or dye (or combination thereof), or a combination of pigments or dyes other than carbon black, is particularly useful as an opacifying colorant, of which there are many types available from commercial sources. Combinations of dyes or pigments such as a combination of the subtractive primary colored pigments (cyan, magenta, and yellow colored pigments) can also be used to provide a visually neutral (e) opacifying colorant.

The (e) opacifying colorant can be generally present in the foamable aqueous composition in an amount of at least 0.001 weight % or even at least 0.003 weight %, all based on the total weight of the foamable aqueous composition (including the weight of all solvents). These amounts refer to the total amount of one or a mixture of (e) opacifying colorants. The upper limit for the (e) opacifying colorant(s) can be 2 weight %.

In some embodiments, the (e) opacifying colorant is a carbon black that is present in an amount of at least 0.003 weight % and up to and including 0.2 weight %, based on the total weight of the foamable aqueous composition.

Foamed Aqueous Compositions

Foamed aqueous compositions can be prepared using the procedures described below wherein an inert gas (such as air) is mechanically incorporated into the foamable aqueous composition as described above, which procedures are designed to provide a foam density of at least 0.1 g/cm$^2$ and up to and including 0.5 g/cm$^3$, or more likely of at least 0.15 g/cm$^3$ and up to and including 0.4 g/cm$^3$. Foam density can be determined gravimetrically by weighing a known volume of the foamed aqueous composition.

The resulting foamed aqueous composition generally has at least 35% solids and up to and including 70% solids.

Components (a) through (e) of the foamed aqueous composition are generally present in the same amounts as described for the foamable aqueous composition (described above) as the foaming process does not appreciably add to or diminish the amounts of such components.

Foamed, Opacifying Elements

Foamed, opacifying elements can be prepared using methods described below. Such articles comprise a substrate, a foamed opacifying layer formed on the first opposing surface in a manner described below, and a functional composition may be disposed over (or directly on in some embodiments) the foamed opacifying layer, for example as a non-foamed functional layer, as described below. Each substrate useful herein generally has two opposing sides, for example, a first opposing surface (or side) and a second opposing surface (or side), which opposing surfaces are generally planar in form.

Some foamed, opacifying elements can be designed with multiple layers including a single foamed opacifying layer. A multiple-layer structure can for example, comprise at least one foamed opacifying layer sandwiched between foamed non-opacifying layers, or a foamed opacifying layer disposed directly on a substrate with a foamed non-opacifying layer (other than a functional layer as described below) disposed directly on the foamed opacifying layer, or a non-opacifying layer disposed directly on a substrate and a foamed opacifying layer disposed directly on the non-opacifying layer. In some embodiments, a foamed opacifying layer can be the outermost layer in the foamed, opacifying element, and it is possible that such foamed, opacifying elements contains only a single foamed opacifying layer. Useful foamed non-opacifying layers can be of any suitable construction but they do not contain the (e) opacifying colorant(s) as described above that are essential for the foamed opacifying layers. Such foamed non-opacifying layers are also different at least in construction from the nonfoamed functional composition or layer described below.

Component (a) nonporous polymeric particles that are present in the foamed opacifying layer in an amount of at least 0.1 weight % and up to and including 40 weight % or at least 0.5 weight % and up to and including 20 weight % are described in detail above, the amounts based on the total weight of the foamed opacifying layer.

In addition, the foamed opacifying layer includes a (b') matrix material that is derived from a (b) binder material upon curing, which (b') matrix material is generally present in an amount of at least 10 weight % and up to and including 80 weight %, or at least 20 weight % and up to and including 60 weight %, based on the total weight of the foamed opacifying layer. Such (b') matrix materials are at least partially cured or crosslinked as described below and can be cured up to 100% of all potential curable or crosslinking sites in the (b) binder material.

Two or more (c) additives can be present in an amount of at least 0.0001 weight % and up to and including 50 weight %, or at least 1 weight % and up to and including 45 weight %, such (c) two or more additives described above. The amounts are based on the total weight of the foamed opacifying layer. As noted above, embodiments can include at least one foaming agent and at least one foam stabilizing agent.

The foamed opacifying layer can comprise one or more tinting colorants as some of the (c) two or more additives, for example in the (a) nonporous polymeric particles, in an amount of at least 0.0001 weight % and up to and including 3 weight %, based on the total weight of the foamed opacifying layer.

It is also useful to include one or more optical brighteners as (c) two or more additives in an amount of at least 0.001 weight % and up to and including 0.4 weight %, based on the total weight of the foamed opacifying layer.

Unless otherwise noted, the term "foamed opacifying layer" used herein refers to a foamed and densified (and optionally cured) layer substantially in dry form, that contains less than 5 weight %, or even less than 2 weight %, of aqueous medium (including water and any auxiliary solvents), based on the total weight of the dry foamed composition. The foamed opacifying layer generally comprises at least 90% solids, or at least 95% solids.

The foamed opacifying layer can also contain at least 0.002 weight %, or even at least 0.02 weight % and up to and including 2 weight % or up to and including 1 weight %, of one or more (e) opacifying colorants (as described above), based on the total weight of the foamed opacifying layer. Such (e) opacifying colorants can be present in locations described above. As noted above, the (e) opacifying colorants are different in composition and function from all other materials in the foamed opacifying layer. The possible locations of the (e) opacifying colorant are described above.

For example, a carbon black can be present as the (e) opacifying colorant in an amount of at least 0.001 weight % and up to and including 1 weight %, based on the total weight of the foamed opacifying layer.

The foamed, opacifying elements are designed particularly to exhibit an optical density (OD) of at least 3 or more likely at least 5. The OD value can be determined as described herein.

Substrates can comprise various porous or non-porous materials including but not limited to woven and nonwoven textile fabrics composed of nylon, polyester, cotton, aramide, rayon, polyolefin, acrylic wool, porous glasses, fiberglass fabrics, or felt or mixtures thereof, or porous polymeric films [such as porous films derived from triacetyl cellulose, polyethylene terephthalate (PET), diacetyl cellulose, acetate butyrate cellulose, acetate propionate cellulose, polyether sulfone, polyacrylic based resin, for example, poly(methyl methacrylate), a polyurethane-based resin, polyester, polycarbonate, aromatic polyamide, polyolefins (for example, polyethylene and polypropylene), polymers derived from vinyl chloride (for example, polyvinyl chloride and a vinyl chloride/vinyl acetate copolymer), polyvinyl alcohol, polysulfone, polyether, polynorbornene, polymethylpentene, polyether ketone, (meth)acrylonitrile], porous paper or other porous cellulosic materials, canvases, porous wood, porous plaster and other porous materials that would be apparent to one skilled in the art.

Some useful substrates comprise a fabric comprising a plurality (at least two) continuous yarn strands woven or knitted together. As used herein, the "yarn" comprises continuous strands (at least two) of a material, which strands are twisted or woven together to form a "thread." Each yarn strand comprises a multifilament core that is encased in a coating comprising a thermoplastic polymer.

The multifilament core can comprise multiple (at least two) filaments composed of naturally occurring fibers or polymers, or of synthetic polymers selected from the group consisting of an aramid, a polypropylene, a polyethylene, an acrylic resin, nylon, and a polyester. Alternatively, the multifilament core can comprise fiberglass as multiple filaments. Each of the multiple filaments can be composed of the same material or a mixture of such materials. Alternatively, the multiple filaments can be homogenous, but filaments composed of different materials can be used in the same multifilament core.

Each filament of the multifilament core can further comprise a flame retardant, examples of which would be readily apparent to one skilled in the art. A multifilament core can be prepared using known technology, for example as described in U.S. Patent Application Publication 2007/0015426 (Ahmed et al.).

The coating applied to the multifilament core can comprise one or more thermoplastic polymers, including but not limited to a polyester elastomer, a polypropylene, a polyethylene, an ethylene octane copolymer, a substituted or unsubstituted vinyl chloride polymer (including homopolymer and copolymers derived in part from vinyl chloride), polyvinylidene fluoride, ethylene vinyl acetate, a thermoplastic polyurethane, poly(tetrafluoroethylene) (PTFE), a silicone resin, and various hot melt adhesives. Various grades or combinations of these materials can be used if desired. The term "thermoplastic" refers to a polymeric material or resin that changes properties when heated and cooled.

Besides the thermoplastic polymer, the coating can further comprise a colorant (such as one or more pigments or dyes), a flame retardant, an antimicrobial agent, an inert inorganic pigment, a thermoplastic resin, a polyurethane, an ethylene vinyl acetate copolymer, or any combination of these materials. Examples of useful additives to the coating would be readily apparent to one skilled in the art and some representative materials are described in U.S. Patent Application Publication 2007/0015426 (noted above).

Each continuous yarn strand can generally have an average diameter of at least 0.15 mm, and it can be at least 0.2 mm and up to and including 1.5 mm, or at least 0.2 mm and up to and including 1 mm, in length, wherein "average" is determined from at least 5 measurements along the same strand. Each strand can have a uniform or non-uniform cross-sectional area.

Useful substrates generally have an openness (or Openness Factor) of 0% and up to and including 10%, or at least 1% and up to and including 10%, or of at least 5% and up to and including 10%.

The substrates can be surface treated before application of the aqueous foamed composition by various processes including corona discharge, glow discharge, UV or ozone exposure, flame, or solvent washing in order to promote desired adhesion and other physical properties.

Nonfoamed Functional Composition Formulations

A nonfoamed functional composition may be used to provide the foamed, opacifying elements with one or more functional properties as described below. A nonfoamed functional composition can comprise (i) glass particles (described below) as the sole essential component. However, in some embodiments containing the (i) glass particles (such as hollow glass particles), a (ii) solid lubricant (described below) can be also present. In still other embodiments, a (ii) solid lubricant and a (iii) tinting material (described below) can be present together with the (i) glass particles. In still other embodiments, (i) glass particles can be combined with a (iii) tinting material, but a (ii) solid lubricant is not present.

The term "nonfoamed" means that there is no purposeful attempt to foam the functional composition as described herein for the foamable aqueous compositions. Thus, any foam properties in the nonfoamed functional composition would be accidental or unintentional and the foam density of such nonfoamed functional composition would be less than 0.1 g/cm$^2$ or even less than 0.05 g/cm$^2$ so as to distinguish the nonfoamed functional composition from the foamable or foamed aqueous opacifying compositions.

A nonfoamed functional composition can be disposed over (for example, directly on) the foamed opacifying layer in a uniform continuous manner to form a nonfoamed functional layer. The nonfoamed functional composition can be disposed on the foamed opacifying layer in a discontinuous manner, in small or large regions, for example, by spraying to form a regular or irregular pattern. In many embodiments, the nonfoamed functional composition can be disposed directly on the foamed opacifying layer in a uniform or discontinuous manner so that there are no intermediate materials or layers between the foamed opacifying layer and the nonfoamed functional composition.

The nonfoamed functional composition can be present in a foamed, opacifying element at a dry coverage of at least 0.5 g/m$^2$ and up to and including 15 g/m$^2$ or of at least 1 g/m$^2$ and up to and including 10 g/m$^2$.

The nonfoamed functional composition can provide one or more functions simultaneously. For example, it can provide one or more of: a "release" function where the coefficient of friction between the opacifying layer and any other solid surface is reduced allowing easy separation of the contacting surfaces; an anti-blocking function where microscopic protrusions or asperities help to minimize surface adherence between the foamed opacifying layer and any other solid surface by increasing the distance between the two contacting surfaces, thereby minimizing blocking; antimicrobial function (with one or more antimicrobial agents present); tactile function where the functional composition enhances the tactile experience (or "feel") of the opacifying layer; antistatic function to reduce static charge; and a soil resistance function to reduce potential soiling. These functional properties can be provided by one or more described components (i), (ii), (iii), (iv), and (v) in the nonfoamed functional composition, and some components can provide multiple functions.

Useful (i) glass particles generally have an average particle size of at least 5 μm, or at least 20 μm and up to and including 100 μm, or up to and including 60 μm. Average particle size can be determined by using known procedures and equipment to measure the largest diameter of a plurality of (i) glass particles and determining an arithmetic average. The (i) glass particles can be present in the nonfoamed functional composition in an amount of at least 10 weight % or at least 25 weight % and up to and including 80 weight % or up to and including 99 weight %, based on the total weight of the applied nonfoamed functional composition.

Optionally, a (ii) solid lubricant can be present in the functional composition in non-liquid (or solid) form and generally has a crystallinity of at least 50% and melts very little at temperatures below 40° C. Its wax melt viscosity can be at least 5 centipoise (5 mPa-sec), or at least 10 centipoise (10 mPa-sec) and up to and including 100 centipoise (100 mPa-sec). For example, such (ii) solid lubricants can be selected from one or more components of the group consisting of nonliquid waxes, metal esters of fatty acids such as calcium soaps, graphite, silicone-based polymers, and fluoropolymers, or a combination of any of these materials.

Useful nonliquid waxes include but are not limited to, polyolefins such as polyethylene wax and polypropylene wax as well as long chain hydrocarbon waxes such paraffin wax. Other useful nonliquid waxes include carbonyl group-containing waxes such as long-chain aliphatic ester waxes; polyalkanoic acid ester waxes such as montan wax, trimethylolpropane tribehenate, and glycerin tribehenate; polyalkanol ester waxes such as tristearyl trimellitate, and distearyl maleate; and polyalkanoic acid amide waxes such as trimellitic acid tristearyl amide. U.S. Patent Application Publication 2010/0021838 (Putnam et al.) describes some representative nonliquid waxes in [0054].

Useful silicone-based polymers include but are not limited to, polydimethylsiloxanes of varying molecular weights, for example those having a weight average molecular weight of less than 10,000.

A useful fluoropolymer is polytetrafluoroethylene.

A (ii) solid lubricant described herein can be present in the nonfoamed functional composition at a dry coverage of at least 0.01 $g/m^2$ and up to and including 30 $g/m^2$.

Moreover, (iii) tinting materials can be present in the nonfoamed functional composition and can be one or more pigments, one or more dyes, or any combination thereof. For example, the (iii) tinting material can be used to provide a $\Delta E$ 2000 value of at least 3.5, and more likely of at least 4 relative to the a foamed, opacifying element from which the non-foamed functional composition has been omitted (not applied).

Other useful (iii) tinting materials can comprise cyan, magenta, yellow, red, green, or blue pigments, or combinations two or more thereof, that reflect or scatter in a region of the visible electromagnetic spectrum to produce the desired coloration or hue. Moreover, white pigments can be combined with one or more of the cyan, magenta, yellow, red, green, or blue pigments.

Such (iii) tinting material can be present in the nonfoamed functional composition at a dry coverage of at least 0.01 $g/m^2$ and up to and including 45 $g/m^2$.

The nonfoamed functional composition can also comprise an (iv) organic polymeric binder in which the (i) hollow glass particles, (ii) solid lubricant, (iii) tinting material and other components are dispersed. This (iv) organic polymeric binder can be water-soluble or water-dispersible and can comprise one or more materials. In addition, the (iv) organic polymeric binder can be film-forming, that is, it can form a film once applied and dried. Such materials can be self-crosslinkable and crosslinkable using a suitable (v) crosslinking agent. The (iv) organic polymeric binder can be present in an amount of at least 1 weight % and up to and including 90 weight % based on the total nonfoamed functional composition weight.

Additionally, it may be beneficial to chemically crosslink some (iv) organic polymeric binders to improve nonfoamed functional composition cohesiveness.

Attractive finishes can be imparted to an outer surface of the foamed, opacifying element for example, by flocking the foamed opacifying layer (and any nonfoamed functional composition disposed thereon). Flock fibers (0.2 mm and up to several mm) can be disposed thereon either by electrostatic or mechanical techniques.

Method of Making Nonfoamed Functional Compositions and Foamed, Opacifying Elements The foamed, opacifying elements can be prepared using essential functions A) through G) described below, although the order of functions E) and F) can be reversed. Firstly, the method is carried out by A) providing a foamable aqueous composition as described above consisting essentially of components (a) through (e) in the described amounts and having at least 35% solids and up to and including 70% solids.

The foamable aqueous composition can be B) aerated to provide a foamed aqueous composition having a foam density of at least 0.1 $g/cm^3$ and up to and including 0.5 $g/cm^3$. This aeration procedure can be carried out using suitable conditions and equipment that would be readily apparent to one skilled in the art in order to create a “foam”. For example, aeration can be carried out by mechanically introducing air or an inert gas (such as nitrogen or argon) in a controlled manner. High shear mechanical aeration can be carried out using sonication or high-speed mixers, such as those equipped with a cowles blade, or with commercially available rotorstator mixers with interdigitated pins such as an Oakes mixer or a Hobart mixer, by introducing air under pressure or by drawing atmospheric air into the foamable aqueous composition with the whipping action of the mixer. It can be useful to chill or cool the foamable aqueous composition below ambient temperature to increase stability by increasing composition viscosity, and to prevent its collapse. Stability of the foamed aqueous composition can also be enhanced by the presence of a foam stabilizing agent as another of the (c) two or more additives.

Once the foamed aqueous composition has been formed, it can be C) disposed onto a first opposing side of a suitable substrate (described above), such as a porous woven substrate that also has a second opposing surface. For example, the substrate can be coated with the aqueous foamed composition using any suitable known coating equipment (floating knife, hopper, blade, or gap) and coating procedures including but not limited to, blade coating, gap coating such as “knife-over-roll” and “knife over table” operation, floating knife, slot die coating, or slide hopper coating, especially if multiple layers are applied to the substrate in the same operation, to provide a foamed opacifying layer. Useful layer forming (coating) means are described, for example, in U.S. Pat. No. 4,677,016 (Fetziger).

The amount of foamed aqueous composition to be applied should be sufficient to provide a dry foamed composition or foamed opacifying layer having a dry coverage of less than or equal to 10 ounces (mass)/$yard^2$ (or less than or equal to 339.08 $g/m^2$).

Once the foamed aqueous composition has been formed on the first opposing surface of the substrate, it can be D) dried. There may be some unintentional curing of the (b) binder material at this point. Drying can be accomplished by any suitable means such as by heating with warm or hot air, microwaves, or IR irradiation at a temperature and time sufficient for drying (for example, at less than 160° C.).

After drying, the dry foamed composition on the substrate can be E) crushed or densified on the substrate, and F) cured, in this order or in the opposite order. Thus, these operations can be carried out as E) densifying (crushing) and then F) curing, or as F) curing and then E) densifying (crushing). A foamed opacifying layer is formed using this combination of functions, and the F) curing function converts most if not all of the (b) binder material to (b') matrix material.

E) Densification or crushing is a process of subjecting the dry foamed opacifying layer to mechanical pressure, to densify and to reduce its thickness. This process can be carried out in any suitable manner, but it is generally carried out by a process that provides pressure to the dry foamed opacifying layer, for example, by passing the substrate with the dry foamed opacifying layer through a compression calendering operation, pressing operation, or embossing operation, or a combination thereof. The original thickness of the dry foamed opacifying layer can be reduced by at least 20% during such an operation. This process can be considered a "densifying operation" as the dry foamed opacifying layer is made denser while it is pressed together. The thickness of the dry foamed opacifying layer before and after crushing (densifying) can be determined by a known technique such as laser profilometry.

The crushing or densifying process can be carried out at any suitable temperature including room temperature (for example, 20-25° C.) and up to and including 90° C. A useful can be at least 15 psi (103.4 kPa) and up to and including 200 psi (1379 kPa).

F) Curing the b) binder materials to form (b') matrix materials can be carried out before or after the E) densification or crushing operation by heat or radiation or other conditions to which the (b) binder materials and catalysts are responsive for crosslinking. In some embodiments, a suitable functionalized self-crosslinking latex composition can be used as the (b) binder material. During this operation, a curing or crosslinking reaction can occur between reactive side groups of suitable curable polymer chains.

At some time after the D) drying operation, the method comprises G) disposing a nonfoamed functional composition (as described above) as a nonfoamed functional composition formulation, over either the dry foamed composition or the foamed opacifying layer, depending upon the timing of this operation. In many embodiments, the nonfoamed functional composition formulation is disposed directly on either the dry foamed composition or the foamed opacifying layer.

The nonfoamed functional composition can be disposed on the dry foamed composition or the foamed opacifying layer using any number of suitable application techniques.

After application of the nonfoamed functional composition formulation to the opacifying element, the nonfoamed functional composition is generally dried by simple evaporation of water (and any other solvents). Further details of coating and drying techniques are described in further detail in Research Disclosure No. 308119, December 1989, pages 1007-1008 and in references cited therein. Curing of the disposed nonfoamed functional composition can also be carried out during or subsequently to drying at temperatures for example, from 100-160° C.

After the G) disposing (and drying) procedure, and optionally curing, it is possible to provide an embossed design on an outer surface of the foamed, opacifying element, for example by patterned embossing or calendering the outer surface, to create selected regions of high or low opacity and thickness. The resulting embossed design can be viewed from either side in transmission.

It is further possible to print images on either the first outer surface or the second outer surface of the foamed, opacifying element after the G) disposing procedure, drying, and optionally curing, using any suitable printing means such as inkjet printing or flexographic printing, thereby forming printed images of text, pictures, symbols, or combinations thereof. Such printed images can be visible, or they can be invisible to the unaided eye (for example, using fluorescent dyes in the printed images). Alternatively, the first outer surface or the second outer surface can be covered by suitable means with a colorless layer to provide a desired protective finish.

A thermally printed image can be formed on either the first outer surface or the second outer surface, for example, by using a thermal (sublimable) dye transfer printing process (using heat and with or without pressure) from one or more thermal donor elements comprising a dye donor layer comprising one or more dye sublimation printable colorants. For example, a thermal colorant image can be obtained using one or more thermal dye patches with or without a thermal colorless (clear) patch.

The following Examples are provided to illustrate the practice of this invention and are not meant to be limiting in any manner. The following materials were used in the Examples.

The following materials were used in the Examples:

The polymers used for making the solid polymeric nonporous particles of this invention was Eastman™ Cellulose Acetate Butyrate 381-0.5 (CAB), a cellulose ester (obtained from Chem Point).

NALCO®1060 containing colloidal silica was obtained from Nalco Chemical Company as a 50 weight % aqueous dispersion.

The poly(methylamino ethanol adipate) (AMAE) co-stabilizer was prepared using known procedures and starting materials.

Carboxy methylcellulose (CMC, 250,000 kDa) was obtained from Acros Organics or from Ashland Aqualon as Aqualon 9M31F. These products were used interchangeably.

TERGITOL® 15-S-7, a C12-C14 secondary alcohol surfactant having an HLB value of 12.4, was obtained from the Dow Chemical Corp.

The optical brightener TINOPAL® OB CO was obtained from BASF Corporation.

The carbon black (K) opacifying colorant was used as compounded 33% Mogul L (Cabot Corp.). Dianal ER502 (styrene acrylic resin from Dianal America) masterbatch (KMB) in making the solid nonporous particles of this invention The textile fabric substrates used in the Examples below were various woven polyester fabrics, having a weight of approximately 80-486 g/m$^2$.

The foamable aqueous composition (CF drapery compound) was made from a formulation comprising a self-crosslinking copolymer derived from n-butyl acrylate, ethyl acrylate, and N-methylol acrylamide using a known procedure, and having a glass transition temperature (Tg) of approximately −25° C. as the (b) binder material from which the (b') matrix material was derived, and (c) additives titanium dioxide, clay filler, a flame retardant, and surfactants for foam creation and stabilization.

Measurements:

The mode particle size of the solid nonporous polymeric particles was measured using a Sysmex FPIA-3000 automated particle size analyzer from Malvern Panalytical.

The opacity or light blocking ability of the foamed, opacifying element in the Examples, in transmitted light, was evaluated by measuring its optical density (OD) using a custom-built apparatus consisting of a fiber optic light source, a computer controlled translational stage, and an optical photometer. The fiber optic was positioned 10 mm above the surface of the fabric. A photodetector was placed on the other side of each sample element directly under the fiber optic in order to quantify the amount of light that passed through the sample element. The OD of each element sample was calculated by comparing the light that passed through the element sample to the light that reached the detector when no element sample was present.

Nonporous Polymeric Particles Containing 1.2% Carbon Black Opacifying Colorant were prepared as follows:

A 15 weight % (1400 g) of ethyl acetate containing 984.6 g of dissolved CAB, 7.63 g of the masterbatch KMB, and 2.1 g of Tinopal® OB CO optical brightener, was prepared from which 1336 g was added to 2250 g of an aqueous phase made up of 2124 g of a pH 4 acetate buffer, 100.2 g of Nalco® 1060, and 25 g of AMAE co-stabilizer, and the mixture was homogenized for two minutes at 6800 RPM using a Silverson L4R homogenizer. The resulting oil-in-water emulsion was further homogenized using a Micronuidizer Model #110T from Micronuidics at a pressure of 9800 psi (690 kgf/cm$^2$), diluted with an equal weight of water and the ethyl acetate evaporated using a Heidolph Laborata rotary evaporator at 40° C. under reduced pressure. The resulting suspension of non-porous particles was filtered using a glass fritted funnel and washed with water several times followed by rinsing with a 0.05 weight % solution of Tergitol® 15-S-7. The isolated 5.5 micrometer sized non-porous particles containing 1.2% carbon black were then oven dried to 65% solids.

Preparation of Foamable Aqueous Compositions; Foamed Aqueous Compositions; and Foamed, Opacifying Element:

A foamable aqueous composition containing nonporous particles was prepared by combining 180 grams of nonporous particles with 1220 grams of CF drapery compound. Nonporous polymeric particles were dispersed into the mixture by stirring at 1200 rev/minute using a 50-mm diameter Cowles blade at ambient temperature for 30-60 minutes. The resulting foamable aqueous composition was used to prepare a foamed aqueous composition under pressure using an Oakes 2M Laboratory Mixer Model 2MBT1A. Each resulting foamed aqueous composition, having a foam density of from 0.18 g/cm$^3$ to 0.25 g/cm$^3$, was coated onto a ("first opposing") surface of the porous substrate described above using a coating knife, dried at a temperature of from 85° C. to 145° C. until the moisture content was less than 2 weight %, and crushed ("densified") on the porous substrate between hard rollers under pressure. The dried and crushed opacifying composition was further cured at 160° C. for 2 minutes to crosslink the (b) binder material and form the resulting (b') matrix material. This foamed, opacifying element exhibited an optical density (OD) of 6.5 for the dry opacifying layer weight of 175 g/m$^2$ vs. and OD of 1.7 for a control sample prepared without the nonporous polymeric particles for a comparable dry opacifying layer weight.

The invention has been described in detail with particular reference to certain preferred embodiments thereof, but it will be understood that variations and modifications can be obtained within the spirit and scope of the invention.

The invention claimed is:

1. A foamable aqueous composition for preparing a foamed opacifying composition, having at least 35% solids and up to and including 70% solids, and comprising:

(a) at least 0.05 weight % and up to and including 20 weight % of nonporous polymeric particles, each nonporous polymeric particle having a mode particle size of at least 2 µm and up to and including 50 µm;

(b) at least 15 weight % and up to and including 70 weight % of a (b) binder material having a glass transition temperature ($T_g$) of less than 40° C.;

(c) at least 0.0001 weight % and up to and including 30 weight % of two or more additives, at least one of these two or more additives being a foaming agent and another of these two or more additives being a foam stabilizing agent;

(d) water; and (e) at least 0.001 weight % and up to and including 2 weight %, of an opacifying colorant different from all of the (c) two or more additives, which opacifying colorant absorbs electromagnetic radiation having a wavelength of at least 380 nm and up to and including 800 nm, all amounts being based on the total weight of the foamable aqueous composition.

2. The foamable aqueous composition of claim 1, having at least 40% solids and up to and including 60% solids, and comprising the (a) nonporous polymeric particles in an amount of at least 0.5 weight % and up to and including 15 weight %, the (b) binder material in an amount of at least 20 weight % and up to and including 50 weight %, the (e) opacifying colorant in an amount of at least 0.003 weight % and up to and including 0.2 weight %, all amounts being based on the total weight of the aqueous foamable composition.

3. The foamable aqueous composition of claim 1, wherein the foaming agent and the foam stabilizing agent is chosen from ammonium stearate, sodium lauryl sulfate, ammonium lauryl sulfate, ammonium sulfosuccinate, disodium stearyl sulfosuccinate, diammonium n-octadecyl sulfosuccinamate, an ethoxylated alcohol, a fatty acid soap or a fatty acid condensation product with an alkylene oxide.

4. The foamable aqueous composition of claim 1, wherein the (c) two or more additives further comprise one or more of a biocide, a flame retardant, thickener, and a tinting colorant.

5. The foamable aqueous composition of claim 1, wherein the (e) opacifying colorant comprises a carbon black that is present at least within the (a) nonporous polymeric particles.

6. A foamed aqueous composition for preparing a foamed opacifying layer, having at least 35% solids and up to and including 70% solids, and comprising:

(a) at least 0.05 weight % and up to and including 20 weight % of nonporous polymeric particles, each nonporous polymeric particle having a mode particle size of at least 2 µm and up to and including 50 µm;

(b) at least 15 weight % and up to and including 70 weight % of a (b) binder material having a glass transition temperature ($T_g$) of less than 40° C.;

(c) at least 0.0001 weight % and up to and including 30 weight % of two or more additives, at least one of these two or more additives being a foaming agent and another of these two or more additives being a foam stabilizing agent;

(d) water; and (e) at least 0.001 weight % and up to and including 2 weight %, of an opacifying colorant different from all of the two or more additives of (c), which opacifying colorant absorbs electromagnetic radiation having a wavelength of at least 380 nm and up to and including 800 nm, all amounts being based on the total weight of the foamed aqueous composition, and the foamed aqueous composition having a foam density of at least 0.1 g/cm$^3$ and up to and including 0.5 g/cm$^3$.

7. The foamed aqueous composition of claim 6, having at least 40% solids and up to and including 60% solids, and comprising the (a) nonporous polymeric particles in an amount of at least 0.5 weight % and up to and including 15 weight %, the (b) binder material in an amount of at least 20 weight % and up to and including 50 weight %, the (e) opacifying colorant in an amount of at least 0.003 weight % and up to and including 0.2 weight %, all amounts being based on the total weight of the aqueous foamable composition.

8. The foamed aqueous composition of claim 6 having a foam density of at least 0.15 $g/cm^3$ and up to and including 0.4 $g/cm^3$.

* * * * *